United States Patent [19]

Takahashi et al.

[11] 4,322,159
[45] Mar. 30, 1982

[54] VARIABLE MAGNIFICATION TYPE COPYING MACHINE

[75] Inventors: Sataro Takahashi, Matsuyama; Ryota Ogawa, Kawagoo; Yasunori Arai, Asaka, all of Japan

[73] Assignee: Asahi Kogaku Kogyo Kabushiki Kaisha, Tokyo, Japan

[21] Appl. No.: 183,709

[22] Filed: Sep. 3, 1980

[30] Foreign Application Priority Data

Sep. 10, 1979 [JP] Japan .................. 54-115894

[51] Int. Cl.³ .............. G03B 27/34; G03B 27/40; G03B 27/70; G03B 27/36
[52] U.S. Cl. ........................... 355/57; 355/58
[58] Field of Search ............ 355/39, 40, 55–59, 355/61–63

[56] References Cited

U.S. PATENT DOCUMENTS

| | | | |
|---|---|---|---|
| 3,366,004 | 1/1968 | Czernek et al. | 355/58 |
| 3,704,657 | 12/1972 | Sliwkowski et al. | 355/56 |
| 3,735,686 | 5/1973 | Brewer et al. | 355/56 X |
| 3,832,058 | 8/1974 | Gusovius | 355/56 |
| 4,021,115 | 5/1977 | Jeppesen | 355/56 |

*Primary Examiner*—Richard A. Wintercorn
*Attorney, Agent, or Firm*—Sughrue, Mion, Zinn, Macpeak and Seas

[57] ABSTRACT

A variable magnification type copying system in which original can be duplicated with different magnification factors. Front and rear group lens systems are slidably mounted relative to one another upon front and rear frames which together make up a housing which is slidably mounted in the perpendicular direction upon a magnification unit frame. A stepping electric motor is mounted upon a plate which is rigidly coupled to the housing and slidably movable therewith. A pinion gear engaged with a pinion gear directly upon the output shaft of the motor is engaged with a rack of the rear frame. An L-shaped lever has a first end having a first cam follower held into abutment with a first cam rotatably mounted upon the output shaft of the motor and a second end connected to slidably move the front lens group by the front frame. A second cam is in abutment with a second cam follower upon the magnification unit to move the housing in the perpendicular direction.

5 Claims, 7 Drawing Figures

VARIABLE MAGNIFICATION TYPE COPYING MACHINE

BACKGROUND OF THE INVENTION

The present invention relates to a magnification varying device for use in a copying machine.

In general, a copying machine is used to produce copies which are equal in size to an original. Such a process is hereinafter referred to as "an equal magnification" or "lifesize" duplication or reproduction. However, for carrying, arranging in order or storing large documents such as newspapers or drawings, it is desirable that the copying machine be capable of producing copies which are scaled down from the original. In this respect, conversion magnification factors of 0.866, 0.816 and 0.707 have generally been employed as reduction factors, respectively, to scale down a size in the A column according to Japanese Industrial Standard to a size lower in the B column, for instance, from A3 to B4, or to scale down a size in the B column to a corresponding size in the A column, for instance, from B4 to A4, or to scale down a size in the A or B column to a smaller size in the same column, for instance, from A3 to A4, or from B3 to B4.

A mechanism for providing such size reduction has been described in the specification of Laid-Open Japanese Patent Application No. 65736/1978. However, such a mechanism is still disadvantageous in that it is intricate in construction and it must be manufactured with high accuracy with the result that it is high in manufacturing cost because the size reduction process is carried out by moving an image forming lens and mirrors in the system's scanning optical system.

Furthermore, a size reducing mechanism employing a zoom lens is known in the art. In general, the zooming mechanism of a zoom lens employs a aystem in which zooming is carried out using an elongated cam groove formed in the lens frame as a guide. Because of the groove, such a frame tends to be low in rigidity and is accordingly liable to be deformed. Thus, the use of a zooming mechanism involves difficulties. In addition, a zooming mechanism is necessarily bulky.

Especially in a copying machine using a zoom lens, the lens must be driven by an electric motor so that a stopper mechanism and a motor control device must be employed in combination to position the zoom lens at a desired position. Accordingly, a copying machine employing a zoom lens is unavoidably intricate and high in manufacturing cost.

Accordingly, an object of the present invention is to provide a variable magnification unit which has a low manufacturing cost but high accuracy in which all of the above-described difficulties have been eliminated.

SUMMARY OF THE INVENTION

In accordance with this and other objects of the invention there is provided a variable magnification unit for a copying machine in which the magnification of the unit can be reduced to a desired value by applying an electrical pulse signal, the number of pulses of which corresponds to the desired value or desired size reduction factor, to a stepping electric motor having a reduction gear which operates in response to the electric pulse signal.

More specifically, in accordance with this and other objects of the invention there is provided a variable magnification type copying machine capable of duplicating originals with different duplication magnification factors including an image forming optical system and a stepping motor which rotates by an amount determined by the number of pulses applied thereto by a pulse signal. Means is provided for moving a part of the image forming optical system in response to rotation of the stepping electric motor means to vary the optical path length therein to set a magnification factor of the lens system. Cam means is provided which is rotated by the electric motor. Rotatable lever means is provided having cam followers engaged with the cams rotated by the stepping electric motor. The lever means and the cam means move the optical system for varying the magnification factor thereof according to the number of pulses applied in the pulse signal.

Yet further, in accordance with the invention there is provided a variable magnification type copying machine including a magnification unit frame and a housing slidably mounted therein. The housing includes front and rear frames holding respectively front and rear group lens systems. The rear frame includes a rack member having rack teeth while the front frame includes at least one pin rigidly coupled thereto for slidably moving the front frame relative to the rear frame. A mounting plate is rigidly coupled to the housing for slidably moving therewith. A stepping electric motor is mounted upon the mounting plate. A first pinion gear, a first cam and a second cam are mounted for rotation upon an output shaft of the motor. A second pinion gear is engaged with the teeth of the rack of the rear frame and with the first pinion gear on the output shaft of the motor. An L-shaped lever is rotatably supported upon the mounting plate. The L-shaped lever has a first end with a first cam follower in abutment with the first cam and a second end having an elongated slide groove formed therein in which is disposed a pin coupled to the front frame of the housing. The second cam is in abutment with a second cam follower formed on the magnification unit frame. A first spring biases the L-shaped lever such that the first cam follower is held in abutment with the second cam while a second spring biases the housing towards the second cam follower to hold the second cam in abutment with the second cam follower. The shapes of the two cams are chosen so that a reference edge of an original to be copied is maintained at a fixed position relative to a photosensitive or copying surface as the stepping motor is rotated and as the lens systems are moved to set a desired magnification factor.

DESCRIPTION OF THE PREFERRED EMBODIMENTS

A preferred embodiment of the invention will be described with reference to the accompanying drawings.

Figure 1:
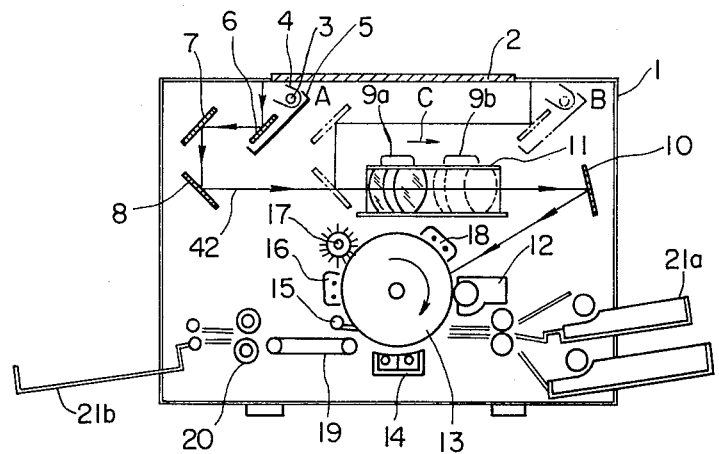
FIG. 1 is a sectional view of a copying machine utilizing a variable magnification unit of the invention.

First, an example of a copying machine incorporating a variable magnification unit of the invention will be described with reference to FIG. 1. As shown in FIG. 1, a contact glass plate 2 on which an original may be placed for copying is provided on the frame 1 of the copying machine. The original placed on the glass plate 2 is irradiated in a scanning manner by a photoelectric lamp 3 which is reciprocated between a standby position A and a completion position B. An irradiation unit 5 includes the photoelectric lamp 3, a reflecting plate 4, and a first mirror 6 for reflecting light from the original image all of which are mounted on a single mounting member so as to reciprocate as a unit. The light reflected by the first mirror 6 is further reflected by a second mirror 7 and a third mirror 8 and is then applied to an image forming lens 9a which is provided at an equal magnification position in the variable magnification unit 11. The light emerging from the lens 9a is reflected by a stationary mirror 10 and then forms an electrostatic latent image on the photosensitive material 13. The latent image on the photosensitive material 13 is developed by a developing unit 12 in a conventional manner. The developed latent image is transferred onto a copying sheet supplied from a sheet supplying unit 21a by a transferring charger 14 and the copying sheet is separated from the drum by a separating pawl 15. The separated copying sheet is conveyed to a fixing unit 20 by a conveyor 19 where it is subjected to fixing and is then delivered to a sheet discharging cassette 21b. The electrostatic charge on the photosensitive material 13 which has passed through the transferring charger 16 is removed by a charge remover 16. Following discharge, the photosensitive material 13 is cleaned by a cleaning unit 17 and is then charged again by a charger 18 so as to be ready for the next operation. The above-described operation is repeatedly carried out.

In the above-described process in which the image of the original on the contact glass plate 2 is formed on the photosensitive material 13 by the irradiation unit 5 operating in a scanning mode and the image thus formed is transferred onto the copying sheet in the developing and transferring steps, the scanning operation for exposure is such that the second and third mirrors 7 and 8 mounted on individual members are moved as a single unit in synchronization with the scanning of the irradiation unit 5. The second and third mirrors 7 and 8 are moved at a suitable speed which is usually half of the speed of the irradiation unit 5 so that the length of the optical path from the original irradiation position to the image forming lens 9a is maintained unchanged.

The variation of magnification in the apparatus as constructed above will be described. Light reflected by the original is reflected by the first, second and third mirrors 6, 7 and 8 and is applied to the image forming lens indicated at 9b which has been moved in the direction of the arrow C to the position corresponding to the length of optical path which provides the selected magnification in accordance with a pulse signal. The light emerging from the lens 9b is reflected by the stationary mirror 10 as a result of which the image of the original, the size of which has been changed according to the selected magnification, is projected onto the photosensitive material 13 on the drum to form a latent image thereon. The latent image is developed by the developing unit 12 and is then transferred onto a copying sheet by the transferring unit 14. The copying sheet thus treated is conveyed to the fixing unit 20 by the conveyor 19 and is then discharged from the apparatus. As is clear from the above description, the magnification of the apparatus is set by moving only the image forming lens.

Figure 2:
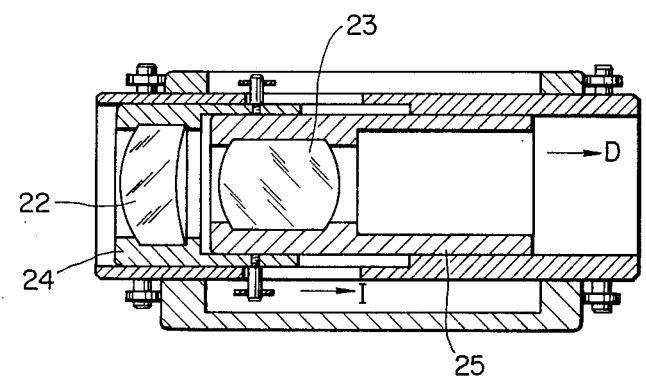
FIG. 2 is an explanatory diagram showing the arrangement of a group of lenses for use with the invention.
Figure 4:
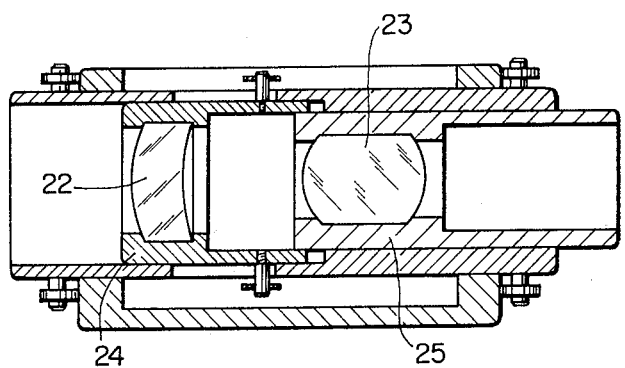
FIG. 4 is an explanatory diagram showing a state of the group of lenses whose magnification has been varied.
Figure 6:
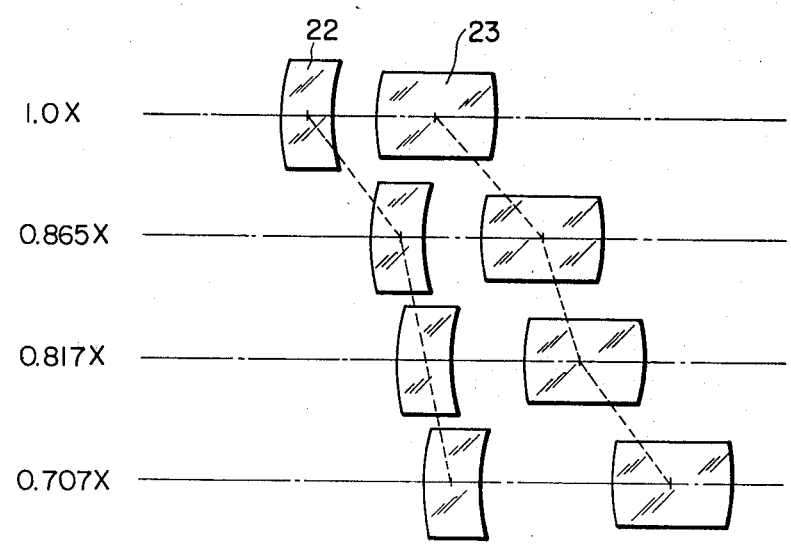
FIG. 6 is an explanatory diagram showing different amounts of movement of the lenses corresponding to the various magnifications.

Shown in FIG. 2 is an example of an image forming lens system applicable to the invention. The image forming lens system is constituted by a two-group type zoom lens including a front group lens system 22 having a negative refractivity and a rear group lens system 23 having a positive refractivity. In a magnification varying operation, the front group lens system 22 and the rear group lens system 23 are moved along the optical axis according to a desired magnification as shown in FIGS. 4 and 6 so that, with the optical path length from the surface of the original to the image forming plane maintained unchanged, the reduced image of the original is projected onto the photosensitive material 13 on the drum.

Figure 7:
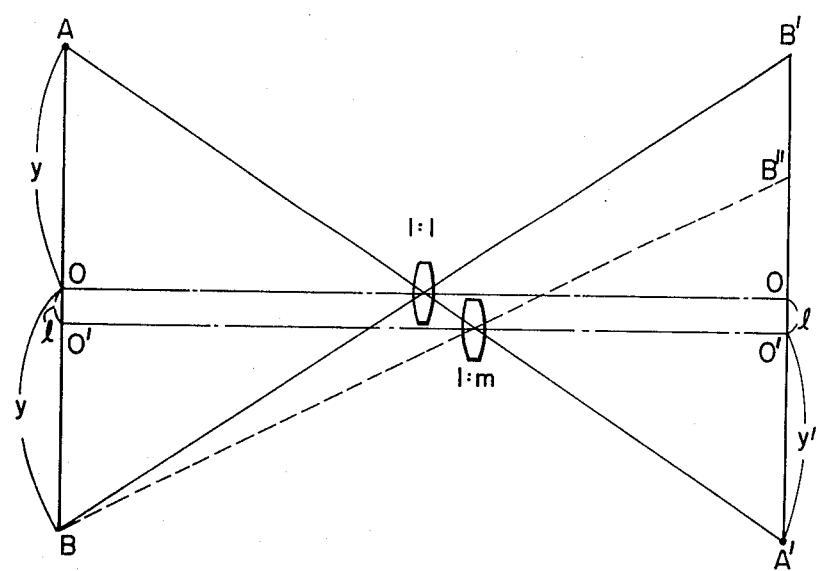
FIG. 7 is an explanatory diagram showing movements of the lens system in the direction of the optical axis and in a direction perpendicular to the optical axis.

In varying the magnification factor, the entire lens system is moved perpendicularly to the optical axis as shown in FIG. 7 a length l corresponding to a desired magnification factor m. If, in this operation, one end A of an original AB is set at a reference position, then the image A' of the one end A is formed at a corresponding constant position at all times irrespective of the magnification factor. Therefore, an edge of a copying sheet can be set in place with the position of the image A' as a reference. As can be seen at this point, the use of the image forming lens system is convenient in operation.

In this respect, the following equations are applicable:

$$(y+l) \div y' = 1 \div m \text{ and}$$

$$y' = y - l$$

where l is the amount of parallel movement of the lens system in a direction perpendicular to the optical axis, y is the distance between the center O of the original to the one end A in FIG. 7, m is the magnification factor, and y' is the distance between image A' of the one end A and an optical axis O'. Therefore, $$l = (1-m)/(1+m)y$$

As is clear from the above description, to perform magnification variation, the zoom lens system requires a first mechanism which moves the front group lens system 22 and the rear group lens system 23 predetermined distances along the optical axis according to a selected magnification factor and a second mechanism which moves the zoom lens system in a direction perpendicular to the optical axis a distance corresponding to the magnification factor.

Figure 3:
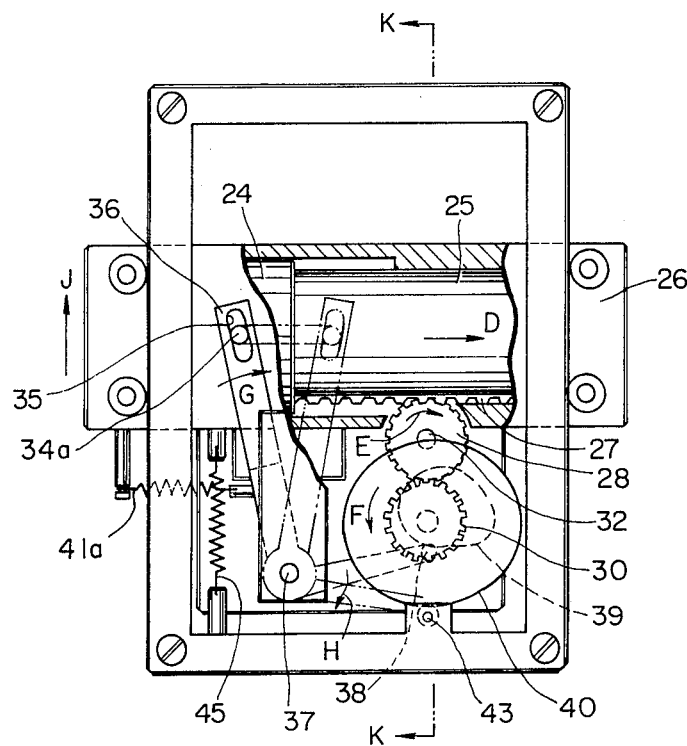
FIG. 3 is a plan view of an example of a variable magnification unit according to the invention.
Figure 5:
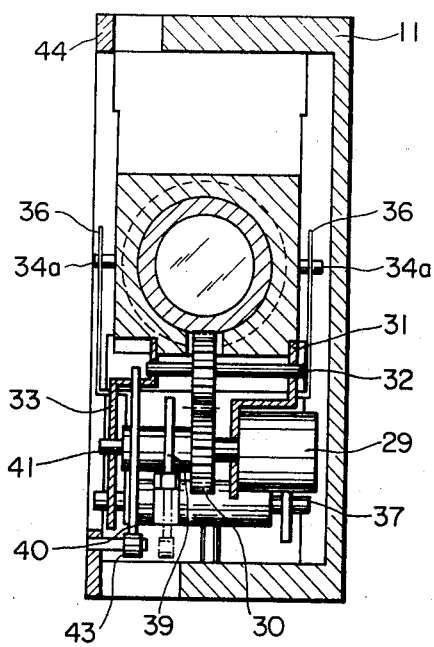
FIG. 5 is a sectional view taken along line K—K in FIG. 3.

The first mechanism will be described with reference to FIGS. 3 and 5. The rear group lens system 23 is mounted in a rear frame 25 which has a rack 27. A pinion gear 28 rotatably mounted on a shaft 32 is engaged with the rack 27. The pinion gear 28 is further engaged with a gear 30 which is coupled directly to a stepping motor 29 along with a reduction gear. The amount of movement of the rear group lens system 23 is controlled by a pulse signal with which the amount of movement is encoded by the number of pulses according to a well-known electrical control technique. The pulse signal is applied to the stepping motor 29 in response to which the stepping motor 29 rotates, for example, in the direction of the arrow F by an amount corresponding to the number of pulse applied. The gear 30 is rotated in the same direction by the motor. At the same time, the pinion gear 28 is turned in the direction of the arrow E as a result of which the rear frame 25 is moved straightly in a housing 26 in the direction of the arrow D by the rack 27 engaged with the pinion gear 28. The stepping motor 29 is mounted on a lower plate 31 which is fixedly secured to the housing 26. An upper plate 33 is fixedly secured to the housing 26 and the shaft 32 of the pinion gear 28 is mounted between the upper plate 33 and the lower plate 31 so that the position of the pinion gear 28 is fixed with respect to the housing 26.

The front group lens system 22 is moved by turning an L-shaped lever 36 having first and second arms with elongated slide grooves 35 which are engaged with pins 34a and 34b fixedly provided on a front frame 24. The lever 36 turns around a lever shaft 37 which is fixedly secured to the lower plate 31 and the upper plate 33. The lever 36 has a third arm which has a cam follower 38 at the end thereof. The cam follower 38 is maintained in abutment with a first cam 39 by a spring 41a connected between the lever 36 and the housing 26. The first cam 39 is so shaped as to produce movement of the front group lens system 22 in amounts corresponding to the desired magnification factor. The first cam 39 and a second cam 40 are integral with a cam shaft 41 coupled to the shaft of the stepping motor 29 and are secured to the gear 30. The cam shaft 41 is rotatably mounted on the upper plate 33.

The stepping motor 29, the gear 30, the first cam 39 and the second cam 40 rotate together upon a common shaft. As the first cam 39 turns in the direction of the arrow F, the cam follower 38 of the lever 36 is moved so that the lever 36 is turned in the direction of the arrow H and accordingly the arms having the elongated guide grooves 35 are turned in the direction of the arrow G thereby causing the pins 34a and 34b engaged with the grooves 35 to slide as a result of which the front group lens system 22 is moved a selected distance in the housing 26 in the direction of the arrow D.

During the above-described movement of the lens systems, the rear group lens system 23 is moved by the stepping motor which is rotated by an amount corresponding to the number of pulses applied to the stepping motor while the front group lens system 22 is moved by cooperation of the cam and the lever which are engaged with the stepping motor. In this manner, the magnification factor can be varied smoothly and continuously by applying a predetermined number of pulses to the stepping motor. Positioning the optical systems, that is, maintaining the distance between the front group lens system 22 and the rear group lens system 23 is effected by the characteristics of the stepping motor. Specifically, when no pulse signal is applied to the stepping motor, a magnetic force is imparted to the rotor of the stepping motor to stop the rotation of the motor. In other words, the optical systems are held in position by an internal action called static torque of the stepping motor. Thus, the front and rear group lens systems are held in place by the stepping motor without the use of an intricate holding mechanism. Since the stepping motor can be electrically controlled so as to turn in the opposite direction, a given reduction magnification can be easily switched back to equal magnification by the above-described mechanism.

Now, the second mechanism which moves the zoom lens system in a direction perpendicularly to the optical axis will be described. The amount of movement of the system perpendicular to the optical axis is defined by the second cam 40. The second cam 40 is held in abutment with a cam follower 43 by a spring 45 which is connected to a bracket 44 at one end thereof. The cam follower 43 is rotatably mounted on the bracket 44 which is rigidly coupled to the variable magnification unit 11.

As the second cam 40 turns in the direction of the arrow F, the cam follower 43 is displaced so that the housing 26 holding the image forming lens system slides inside the variable magnification unit 11 in the direction of the arrow J. The second cam 40 and the first cam 39 are turned simultaneously. Therefore, movements both in the direction of the optical axis and in the direction perpendicular to the optical axis are carried out simultaneously by applying to the stepping motor 29 a pulse signal composed of a series of pulses the number of which is determined according to a selected magnification factor thus carrying out the desired magnification factor variation operation.

As is apparent from the above description, according to the invention, positioning of the lens systems is readily achieved for each selected magnification factor and the variable magnification unit can be made compact. Furthermore, in a magnification varying operation with the use of the invention, it is unnecessary to move the positions of the mirrors. Therefore, a copying machine employing a variable magnification unit of the invention is simple in construction and can be accordingly readily manufactured. Furthermore, maintenance and inspection of such a copying machine can be readily implemented.

What is claimed is:

1. A variable magnification type copying machine capable of duplicating originals with different duplication magnification factors comprising:

an image forming optical system;

stepping electric motor means rotating an amount determined by the number of pulses applied thereto by a pulse signal;

means for moving a part of said image forming optical system in response to rotation of said stepping electric motor means to vary an optical path length to set a magnification factor of said lens system;

cam means rotated by said electric motor; and rotatable lever means having cam followers engaged with said cams, said lever means and said cam means moving said optical system for varying the magnification factor thereof according to the number of said pulses.

2. A variable magnification type copying machine capable duplicating originals with different duplication magnification factors comprising:

a magnification unit frame;

a housing slidably disposed in said magnification unit frame, said housing comprising a front frame and a rear frame slidable longitudinally in said housing in a direction perpendicular to the direction in which said housing slides in said magnification unit frame, said rear frame holding a rear group lens system and said front frame holding a front group lens system, said rear frame comprising a rack portion having rack teeth formed therein, and said front frame having at least one pin rigidly coupled thereto for slidably moving said front frame relative to said rear frame;

at least one mounting plate rigidly coupled to said housing for slidably moving therewith;

a stepping motor mounted upon said mounting plate and slidably movable with said housing, said stepping motor having a first gear directly coupled to an output shaft of said stepping motor;

first and second cams mounted for rotation upon said output shaft of said stepping motor;

a second gear operatively meshed with said teeth of said rack and said first gear directly driven by said stepping motor for moving said rear frame in response to rotation of said motor;

an L-shaped lever rotatably mounted upon said mounting plate, said lever having a first cam follower at one end thereof in engagement with said first cam and a second end in which is formed an elongated slide groove in which is disposed said pin coupled to said front frame for longitudinally moving said front frame; and a second cam follower coupled to said magnification unit frame, said second cam having a cam surface in abutment with said second cam follower wherein rotation of said second cam produces sliding movement of said housing.

3. The copying machine of claim 2 wherein said L-shaped lever has first and second arms each having an elongated slide groove and wherein said front frame has first and second pins on opposite side thereof, each of said pins being engaged with a corresponding one of said elongated slide groovves in said arms of said L-shaped lever.

4. The copying machine of claim 2 or 3 further comprising a first spring coupled between said housing and said magnification unit frame for urging said second cam into abutment with said second cam follower and a second spring coupled between said housing and said L-shaped lever for urging said first cam follower into abutment with said first cam.

5. The copying machine of claim 2 or 3 wherein said first and second cams are shaped so as to maintain the image of a reference edge of an original in a fixed position with respect to a copying surface upon movement of said front and rear group lens systems.

* * * * *